US006957251B2

(12) United States Patent
Wisner et al.

(10) Patent No.: US 6,957,251 B2
(45) Date of Patent: Oct. 18, 2005

(54) SYSTEM AND METHOD FOR PROVIDING NETWORK SERVICES USING REDUNDANT RESOURCES

(75) Inventors: Steven P. Wisner, Richmond, VA (US); James A. Campbell, Ashland, VA (US)

(73) Assignee: Genworth Financial, Inc., Richmond, VA (US)

( * ) Notice: Subject to any disclaimer, the term of this patent is extended or adjusted under 35 U.S.C. 154(b) by 953 days.

(21) Appl. No.: 09/681,607

(22) Filed: May 7, 2001

(65) Prior Publication Data

US 2002/0165944 A1 Nov. 7, 2002

(51) Int. Cl.[7] ................................................ H04L 12/00

(52) U.S. Cl. ....................... 709/220; 709/201; 709/209; 709/223; 709/226; 709/238

(58) Field of Search ................................ 709/201, 209, 709/223, 226, 238, 220

(56) References Cited

U.S. PATENT DOCUMENTS

| | | | | |
|---|---|---|---|---|
| 5,469,503 A | * 11/1995 | Butensky et al. | ...... | 379/265.02 |
| 5,544,347 A | 8/1996 | Yanai et al. | | |
| 5,948,062 A | 9/1999 | Tzelnic et al. | | |
| 5,987,621 A | 11/1999 | Duso et al. | | |
| 5,996,001 A | * 11/1999 | Quarles et al. | ............. | 709/203 |
| 6,078,503 A | 6/2000 | Gallagher et al. | | |
| 6,151,665 A | 11/2000 | Blumenau | | |
| 6,157,932 A | * 12/2000 | Klein et al. | ................. | 707/204 |
| 6,173,377 B1 | 1/2001 | Yanai et al. | | |
| 6,192,408 B1 | 2/2001 | Vahalia et al. | | |
| 6,266,781 B1 | * 7/2001 | Chung et al. | .................. | 714/4 |
| 6,411,991 B1 | 6/2002 | Helmer et al. | | |
| 6,738,773 B1 | * 5/2004 | Reunert et al. | ............... | 707/10 |
| 6,742,051 B1 | * 5/2004 | Bakshi et al. | ............... | 719/318 |

OTHER PUBLICATIONS

PCT–International Search Report dated Aug. 22, 2002 for application No. PCT/US02/14290, filed May 7, 2002.

EMC²–EMC Celerra File Server Production Description Guide 2001 pp. 1–49.

EMC²–Backup Solutions for the Celerra File Server Sep. 2000 pp. 1–6.

EMC²–Cisco Systems and EMC, Delivering Mission–Critical Data Replication over a Highly Available IP Network Infrastructure Mar. 2001 pp. 1–9.

EMC²–What's Going on Inside the Box?, ISV Access Symmetrix Performance and Utilization Matrics Jan. 2000, pp. 1–12.

EMC²Celerra File Server in the E–Infostructure Sep. 2000 pp. 1–9.

EMC²–Oracle, No Data Loss Standby Database, The benefits of combining EMC Symmetrix Remote Data Facility (SRDF) With Oracle8i Automated Standby Database Feb. 2001 pp. 1–18.

(Continued)

*Primary Examiner*—Fritz Fleming
*Assistant Examiner*—Mohammad O. Farooq
(74) *Attorney, Agent, or Firm*—Hunton & Williams LLP

(57) ABSTRACT

A system for providing a network service includes at least first and second data centers containing the same functionality and data content. The first data center designates a first group of resources as active, and another group of resources as standby resources. In a similar, but reciprocal, manner, the second data center designates a first group of resources as active, and another group of resources as standby resources. Users coupled to the first and second data centers may access active resources located in both the first and second data centers. In the event of a partial or complete failure of data center resources, the standby resources are activated and used to service user requests. In one embodiment, the data centers include a three-tier structure including a web access tier, an application logic tier, and a database management tier.

16 Claims, 8 Drawing Sheets

OTHER PUBLICATIONS

EMC[2]–Oracle7 and EMC Symmetrix Remote Data Facility (SRDF) Nov. 1996 pp. 1–22, T1–T10.

EMC[2]–EMC and Cisco Systems Network Attached Storage Solutions, Defining a High–Avaliabilty Topology Jan. 2001 pp. 1–10.

EMC[2]–SRDF Celerra Server Sep. 2000 pp. 1–5.

Brocade Brocade SAN Solutions: A More Effective Approach To Information Storage And Management (2000) pp. 1–15.

Database Administration: Hot Standby For Rdb Systems Dr. Lilian Hobbs <http://www.oracle.com/rdb/product_info/html_documents/hotstdby.html> printed Apr. 6, 2001.

Data Sheet DistributedDirector for Cisco 7200 Series Routers pp. 1–1 to 1–11.

Brocade The Essential Elements Of A Storage Networking Architecture (2001) p. 1–13.

EMC[2]–Celerra File Server Architecture for High Availability Aug. 1999 pp. 1–7.

Brocade Increasing Intelligence Within The SAN Fabric (2001) pp. 1–8.

* cited by examiner fail over state flow

SYSTEM AND METHOD FOR PROVIDING NETWORK SERVICES USING REDUNDANT RESOURCES

BACKGROUND OF THE INVENTION

The present invention generally relates to a system and method for providing network services using redundant resources. In a more specific embodiment, the present invention relates to a system and method for providing a service over a wide area network using multiple data centers having redundant resources.

Network-accessible services are occasionally subject to disruptions or delays in service. For instance, storms and other environment-related disturbances may disable a service for a length of time. Equipment-related problems may also disable the service. In such circumstances, users may be prevented from logging onto the service while it is disabled. Further, users that were logged onto the service at the time of the disturbance may be summarily dropped, sometimes in midst of making a transaction. Alternatively, high traffic volume may render the users' interaction with the service sluggish.

Needless to say, consumers find interruptions and delays in network services frustrating. From the perspective of the service providers, such disruptions or delays may lead to the loss of clients, who may prefer to patronize more reliable and available sites. In extreme cases, disruptions or delays in service may render the provider liable to their consumers for corrupted data and/or lost opportunities attributed to the failure. Applications that are particularly sensitive to these service disruptions include time-sensitive financial services, such as on-line trading services, network-based control systems, etc.

For these reasons, network service providers have shown considerable interest in improving the availability of their services. One known technique involves simply storing a duplicate of a host site's database in an off-line archive (such as a magnetic tape archive) on a periodic basis. In the event of some type of major disruption of service (such as a weather-related disaster), the service administrators may recreate any lost data content by retrieving and transferring information from the off-line archive. This technique is referred to as cold backup because the standby resources are not immediately available for deployment.

Another known technique entails mirroring the content of the host site's active database in an on-line redundant database. In the event of a disruption, this technique involves utilizing the content of the standby database to perform an application. This technique is referred to as warm backup because the standby resources are available for deployment with minimal setup time.

The above-noted solutions are not fully satisfactory. The first technique (involving physically installing backup archives) may require an appreciable amount of time to perform (e.g., potentially several hours). Thus, this technique does not effectively minimize a user's frustration upon being denied access to a network service, or upon being dropped from a site in the course of a communication session. The second technique (involving actively maintaining a redundant database) provides more immediate relief upon the disruption of services, but may suffer other drawbacks. Namely, a redundant database that is located at the same general site as the primary database is likely to suffer the same disruption in services as the host site's primary database. Furthermore, even if this backup database does provide standby support in the event of disaster, it does not otherwise serve a useful functional role while the primary database remains active. Accordingly, this solution does not reduce traffic congestion during the normal operation of the service, and may even complicate these traffic problems.

Known efforts to improve network reliability and availability may suffer from additional unspecified drawbacks.

Accordingly, there is a need in the art to provide a more effective system and method for ensuring the reliability and integrity of network resources.

BRIEF SUMMARY OF THE INVENTION

The disclosed technique solves the above-identified difficulties in the known systems, as well as other unspecified deficiencies in the known systems.

According to one exemplary embodiment, the present invention pertains to a system for providing a network service to users, including a first data center for providing the network service at a first geographic location. The first data center includes first active resources configured for active use, as well as first standby resources configured for standby use in the event that active resources cannot be obtained from another source. The first data center also includes logic for managing access to the resources.

The system also includes a second data center for providing the network service at a second geographic location. The second data center includes second active resources configured for active use, as well as second standby resources configured for standby use in the event that active resources cannot be obtained from another source. The second data center also includes second logic for managing access to the resources.

According to a preferred exemplary embodiment, the first active resources include the same resources as the second standby resources, and the first standby resources include the same resources as the second active resources.

Further, the first logic is configured to: (a) assess a needed resource for use by a user coupled to the first data center; (b) determine whether the needed resource is contained with the first active resources or the first standby resources of the first data center; (c) provide the needed resource from the first active resources if the needed resource is contained therein; and (d) provide the needed resource from the second active resources of the second data center if the needed resource is contained within the standby resources of the first data center. The second data logic is configured in a similar, but reciprocal, manner.

According to yet another exemplary embodiment, the first logic is configured to: (a) assess whether the first active resources have become disabled; and, in response thereto (b) route a request for a needed resource to the second data center. In a similar manner, the second logic is configured to: (a) assess whether the second active resources have become disabled; and, in response thereto (b) route a request for a needed resource to the first data center.

In yet another embodiment, both the first and second data centers each include: a database; a network access tier including logic for managing a user's access to the data center; an application tier including application logic for administering the network service; and a database tier including logic for managing access to the database.

In another exemplary embodiment, the present invention pertains to a method for carrying out the functions described above.

As will be set forth in the ensuing discussion, the use of reciprocal resources in the first and second data centers serves the dual benefit of high-availability and enhanced reliability in the event of failure, in a manner not heretofore known in the art.

BRIEF DESCRIPTION OF THE DRAWINGS

Still further features and advantages of the present invention are identified in the ensuing description, with reference to the drawings identified below, in which.

Figure 1:
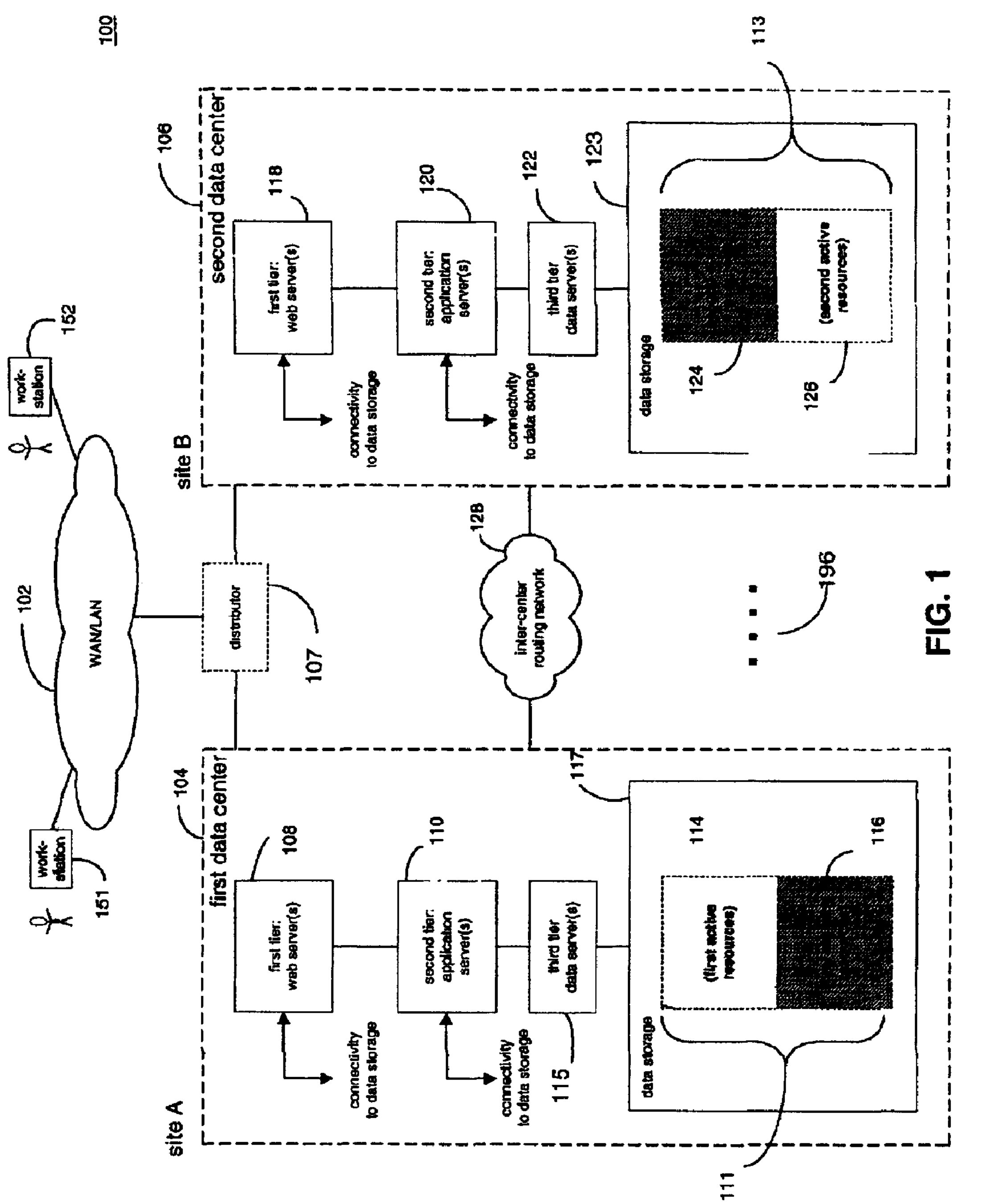
FIG. 1 shows an exemplary system for implementing the invention using at least two data centers.
Figure 2:
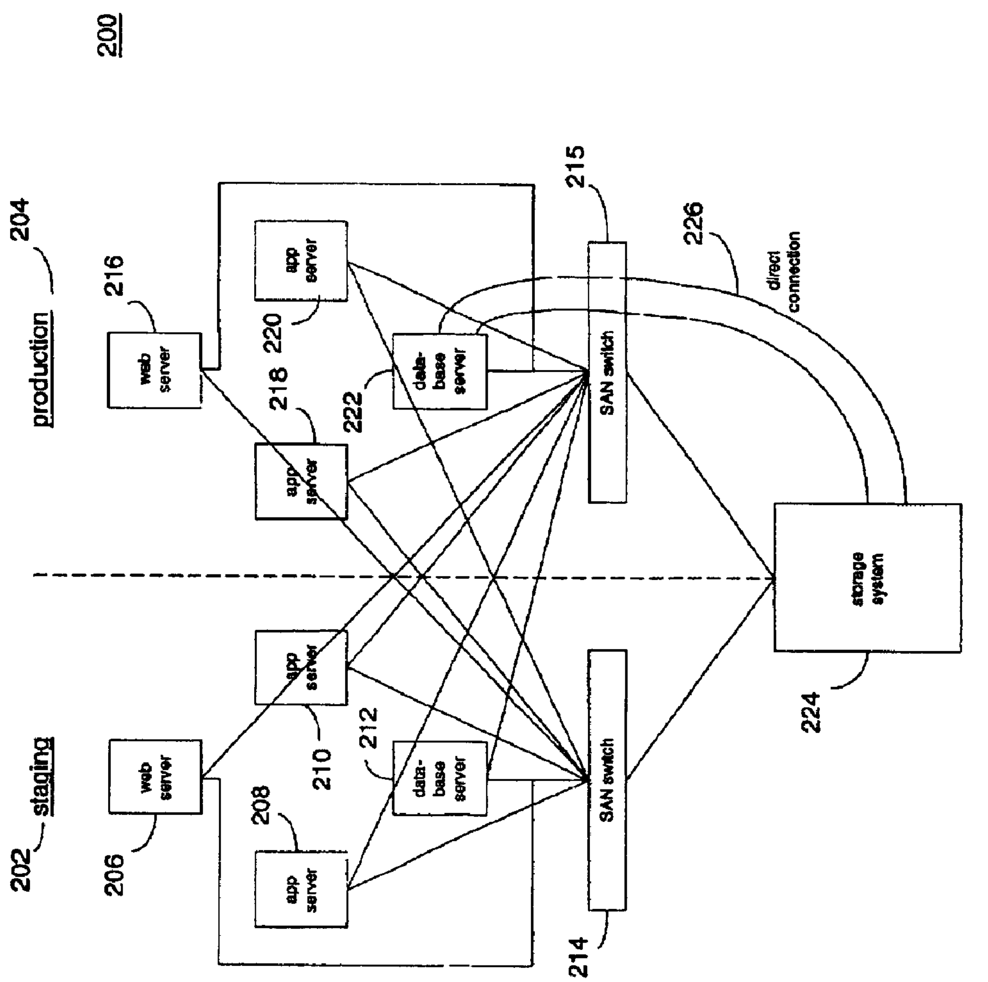
FIG. 2 shows a more detailed exemplary layout of one of the data centers shown in FIG. 1.
Figure 3:
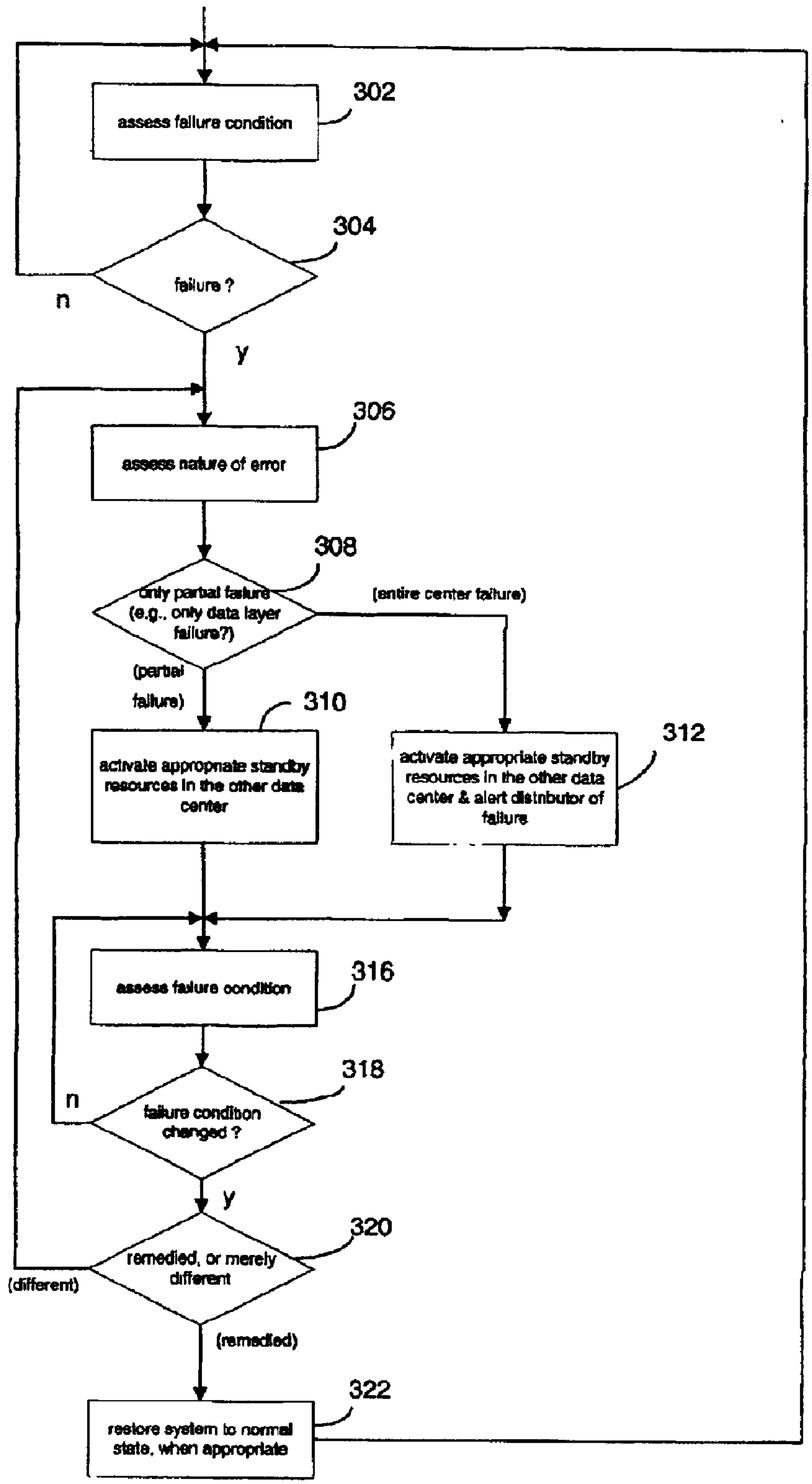
FIG. 3 describes an exemplary state flow for handling failure conditions in the system shown in FIG. 1.
Figure 4:
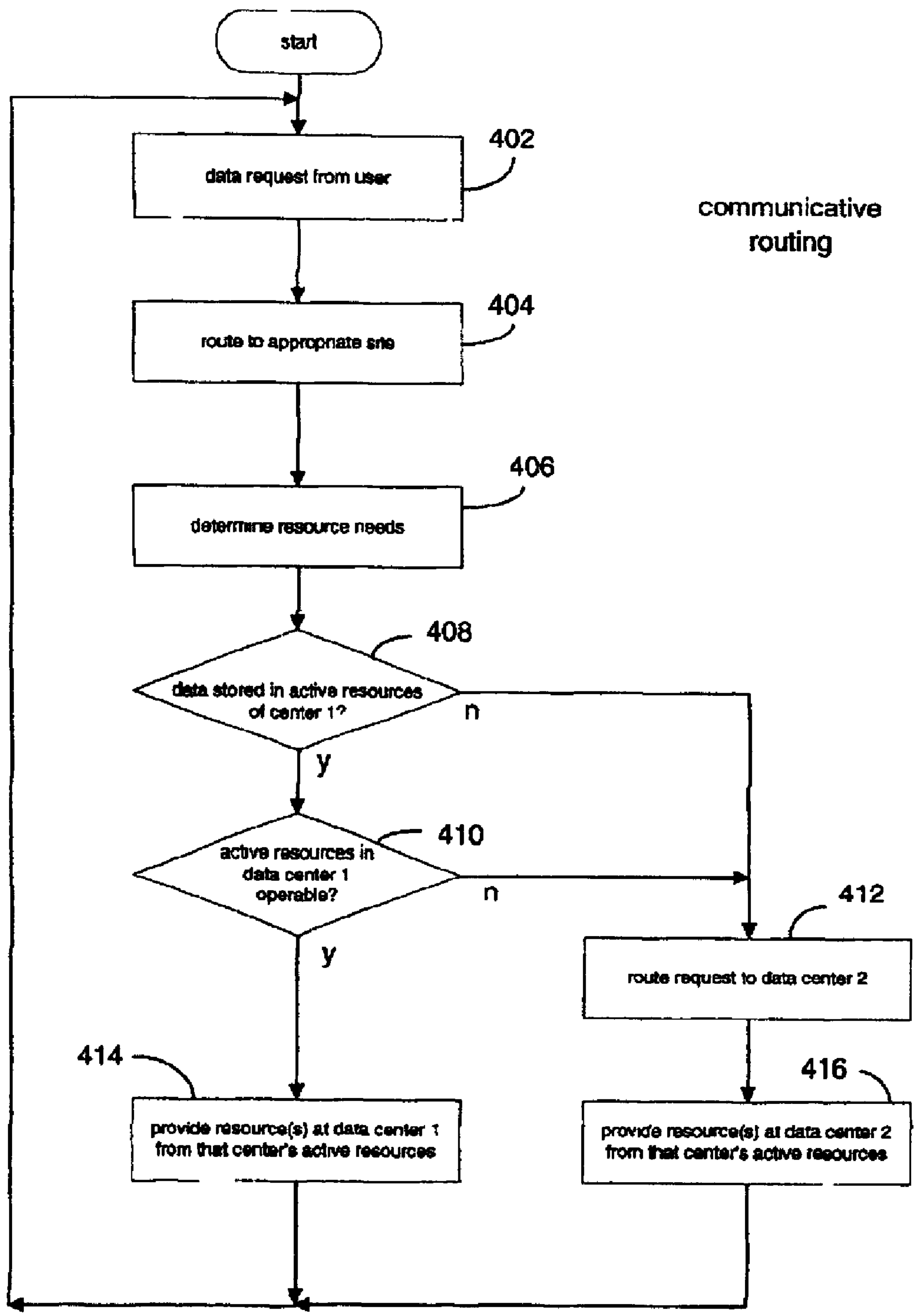
FIG. 4 describes an exemplary process flow for handling a user's data requests for network resources.
Figure 5:
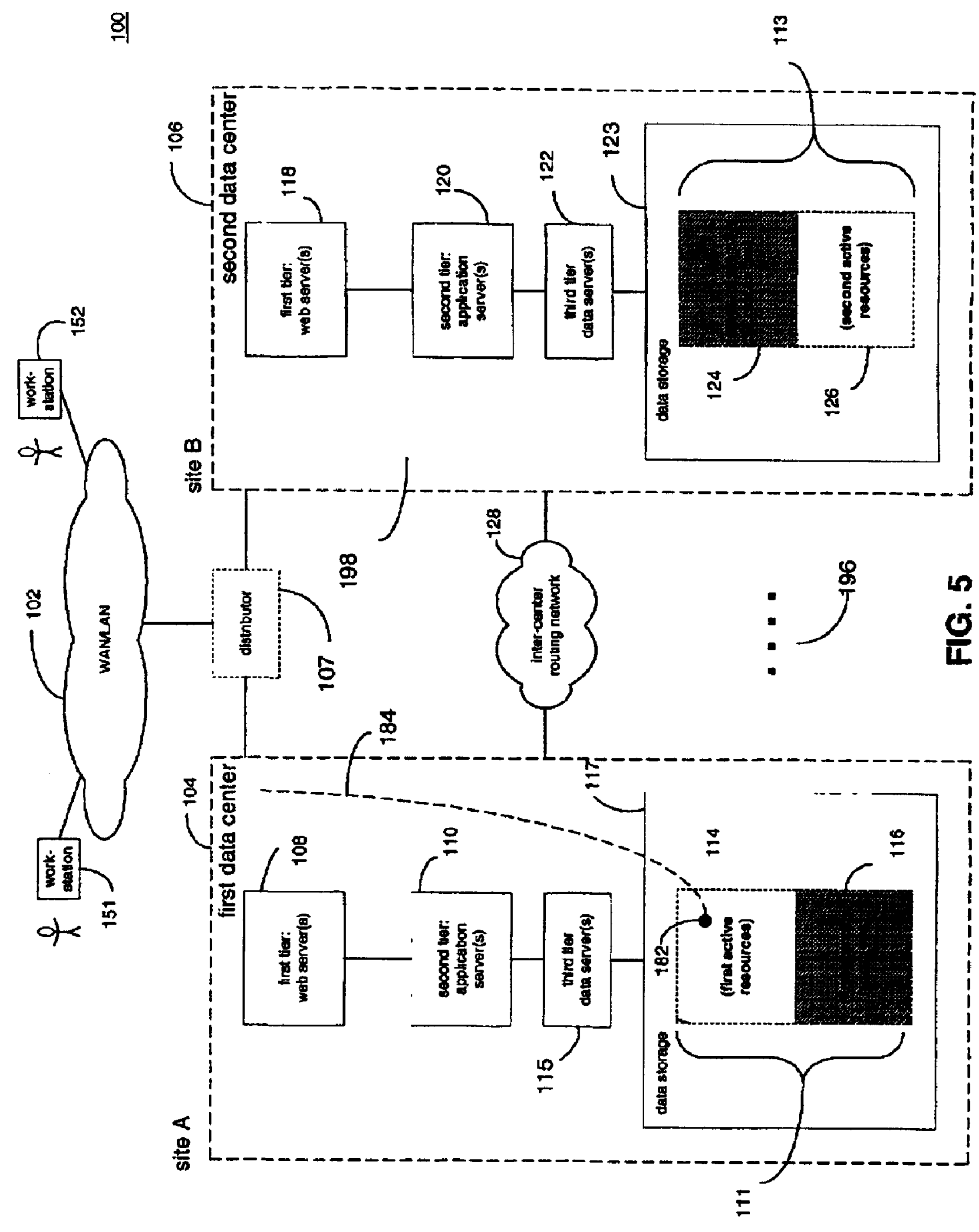
FIGS. 5–8 show exemplary processing scenarios that may occur in the use of the system shown in FIG. 1.

In the figures, level 100 reference numbers (e.g., 102, 104, etc.) pertain to FIG. 1 (or the case scenarios shown in FIGS. 5–8), level 200 reference numbers pertain to FIG. 2, level reference 300 numbers pertain to FIG. 3, and level 400 reference numbers pertain to FIG. 4.

DETAILED DESCRIPTION OF THE INVENTION

FIG. 1 shows an overview of an exemplary system architecture 100 for implementing the present invention. The architecture 100 includes data center 104 located at site A and data center 106 located at site B. Further, although not shown, the architecture 100 may include additional data centers located at respective different sites (as generally represented by the dashed notation 196). Accordingly to one exemplary embodiment, the geographic distance between sites A and B is between 30 and 300 miles. However, in another application, the data centers may be separated by smaller or greater distances. Generally, it is desirable to separate the sites by sufficient distance so that a region-based failure affecting one of the data centers will not affect the other.

A network 102 communicatively couples data center 104 and data center 106 with one or more users operating data access devices (such as exemplary workstations 151, 152). In a preferred embodiment, the network 102 comprises a wide-area network supporting TCP/IP traffic (i.e., Transmission Control Protocol/Internet Protocol traffic). In a more specific preferred embodiment, the network 102 comprises the Internet or an intranet, etc. In other applications, the network 102 may comprise other types of networks driven by other types of protocols.

The network 102 may be formed, in whole or in part, from hardwired copper-based lines, fiber optic lines, wireless connectivity, etc. Further, the network 206 may operate using any type of network-enabled code, such as HyperText Markup Language (HTML), Dynamic HTML, Extensible Markup Language (XML), Extensible Stylesheet Language (XSL), Document Style Semantics and Specification Language (DSSSL), Cascading Style Sheets (CSS), etc. In use, one or more users may access the data centers 104 or 106 using their respective workstations (such as workstations 151 and 152) via the network 102. That is, the users may gain access in a conventional manner by specifying the assigned network address (e.g., website address) associated with the service.

The system 100 further includes a distributor 107. The distributor receives a request from a user to interact with the service and then routes the user to one of the data centers. According to exemplary embodiments, the distributor 107 may comprise a conventional distributor switch, such as the DistributedDirector produced by Cisco Systems, Inc. of San Jose, Calif. The distributor 107 may use a variety of metrics in routing requests to specific data centers. For instance, the distributor 107 may grant access to the data centers on a round-robin basis. Alternatively, the distributor 107 may grant access to the data centers based on their assessed availability (e.g., based on the respective traffic loads currently being handled by the data centers). Alternatively, the distributor 107 may grant access to the data centers based on their geographic proximity to the users. Still further efficiency-based criteria may be used in allocating log-on requests to available data centers.

The data centers themselves may be structured using a three-tier server architecture, comprising a first tier (108, 118), a second tier (110, 120), and a third tier 115, 117, 122, 123). The first tier (108, 118) may include one or more web servers. The web servers handle the presentation aspects of the data centers, such as the presentation of static web pages to users. The middle tier (110, 120) may likewise include one or more application servers. The application servers handle data processing tasks associated with the application-related functions performed by the data center. That is, this tier includes the business logic used to implement the applications. The third tier (115, 122) may likewise include one or more database-related servers. The database-related servers may handle the storage and retrieval of information from one or more databases contained within the centers' data storage (117, 123).

In a preferred embodiment, the first data center 104 located at site A contains the same functionality and database content as the second data center 106 located at site B. That is, the application servers in the second tier 110 of the first data center 104 include the same business logic as the application servers in the second tier 120 of the second data center 106. Further, the data storage 117 in the first data center 104 includes the same database content as the data storage 123 in the second data center.

The illustrated distributed three-tier architecture provides various benefits over other architectural solutions. For instance, the use of the three-tier design improves the scalibility, performance and flexibility (e.g., reusability) of system components. The three-tier design also effectively hides the complexity of underlying layers of the architecture from users. In other words, entities connected to the web do not have cognizance of the data storage because it is managed by an intermediary agent, i.e., the application tier.

Each of the servers may include conventional head-end processing components (not shown), including a processor (such as a microprocessor), memory, cache, and communication interface, etc. The processor serves as a central engine for executing machine instructions. The memory (e.g., RAM, ROM, etc.) serves the conventional role of storing program code and other information for use by the processor. The communication interface serves the conventional role of interacting with external equipment, such as the other tiers in the data centers or the network 102. Each of these servers may comprise computers produced by Sun Microsystems, Inc., 901 of Palo Alto, Calif.

In one entirely exemplary embodiment, the web servers may operate using Netscape software provided by Netscape Communications, of Mountain View, Calif. The application servers may operate using iPlanet computer software provided by iPlanet E-Commerce Solutions, Palo Alto, Calif. In one embodiment, iPlanet software uses a high-performance Java™ application platform supporting Java Servlet extensions, JavaServer Pages ™, and in-process, plugable Java Virtual Machines, etc. The data servers may operate using Oracle database management software provided by Oracle Corporation, Redwood Shores, Calif. The physical data storage may be implemented using the Symmetrix storage system produced by EMC Corporation, Hopkinton, Mass.

Finally, another network connection 128 couples the first data center 104 with the second data center 106, and is accordingly referred to as an inter-center routing network. This connection 128 may be formed using any type of preferably high-speed network configuration, protocol, or physical link. For instance, T1 and T3 based networks, FDDI networks, etc. may be used to connect the first data center 104 with the second data center 106. In an alternative embodiment, the network 128 may be formed, in whole or in part, from the resources of network 102. The inter-center routing network 128 allows the data center 104 to exchange information with data center 106 in the course of providing high-availability network service to users, as will be described in further detail below.

FIG. 2 shows more detail regarding an exemplary architecture that may be used to implement one of the exemplary data centers shown in FIG. 1 (such as data center 104 or 106 of FIG. 1). The architecture 200 includes a first platform 202 devoted to staging, and a second platform 204 devoted to production. The staging platform 202 is used by system administrators to perform back-end tasks regarding the maintenance and testing of the network service. The production platform 204 is used to directly interact with users that access the data center via the network 102 (shown in FIG. 1). The staging platform 202 may perform tasks in parallel with the production platform 204 without disrupting the on-line service, and is beneficial for this reason.

The first tier includes sever 206 (in the staging system) and server 216 (in the production system). The second tier includes servers 208 and 210 (in the staging system) and servers 218 and 220 (in the production system). The third tier includes server 212 (in the staging system) and sever 222 (in the production system), along with storage system 224 (which serves both the staging system and the production system). As mentioned above, each of these servers may comprise computers produced by Sun Microsystems, Inc., 901 of Palo Alto, Calif.

As further indicated in FIG. 2, all of the servers are coupled to the storage system 224 via appropriate switching devices 214 and 215. This configuration permits the servers to interact with the storage system 224 in the course of performing their respective functions. The switching devices (214, 215) may comprise storage array network (SAN) switching devices (e.g., as produced by Brocade Communications Systems, Inc., of San Jose, Calif. Network connections (and other inter-processor coupling) are not shown in FIG. 2, so as not to unnecessarily complicate this drawing.

Returning to FIG. 1, this figure shows an exemplary data-configuration of the above-described structural architecture. In general terms, each data center includes a number of resources. Resources may refer to information stored in the data center's database, hardware resources, processing functionality, etc. According to the present invention, the first data center 104 may be conceptualized as providing a network service at a first geographic location using first active resources and first standby resources (where the prefix first indicates that these resources are associated with the first data center 104). The first active resources pertain to resources designated for active use (e.g., immediate and primary use). The first standby resources pertain to resources designated for standby use in the event that active resources cannot be obtained from another source. The second data center 106 includes corresponding second active resources, and second standby resources.

Further, the first data center 104 may be generally conceptualized as provided first logic for managing access to the active and standby resources. Any one of the tiers (such as the application tier), or a combination of tiers, may perform this function. The second data center 106 may include similar second logic for managing resources.

In the specific context of FIG. 1, the database contained in the first data center 104 includes memory content 111, and the database contained in the second center 106 includes memory content 113. The nature of the data stored in these databases varies depending on the specific applications provided by the data centers. Exemplary types of data include information pertaining to user accounts, product catalogues, financial tables, various graphical objects, etc.

Within memory content 111, the first data center 104 has designated portion 114 as active (comprising the first active resources), and another portion 116 as inactive (or standby) (comprising the first standby resources). Within content 113, the second data center 106 has designated portion 124 as active (comprising the second active resources), and another portion 126 as inactive (or standby) (comprising the second active resources). (The reader should note that the graphical allocation of blocks to active and standby resources in FIG. 1 represents a high-level conceptual rendering of the system 100, and not necessarily a physical partition of memory space.)

In a preferred embodiment, the first active resources 114 represent the same information as the second standby resources 124. Further, the first standby resources 116 represents the same information as the second active resources 126. In the particular context of FIG. 1, the term resources is being used to designate memory content stored in the respective databases of the data centers. However, as noted above, in a more general context, the term resources may refer to other aspects of the data centers, such as hardware, or processing functionality, etc.

The system may be configured to group information into active and standby resources according to any manner to suit the requirements of specific technical and business environments. It is generally desirable to select a grouping scheme that minimizes communication between data centers. Thus, the resources that are most frequently accessed at a particular data center may be designated as active in that data center, and the remainder as standby. For instance, a service may allow users to perform applications A and B, each drawing upon associated database content. In this case, the system designer may opt to designate the memory content used by application A as active in data center 1, and designate the memory content used by application B as active in data center 2. This solution would be appropriate if the system designer had reason to believe that, on average, users accessing the first data center are primarily interested in accessing application A, while users accessing the second data center are primarily interested in accessing application B.

The data centers may designate memory content as active or standby using various technologies and techniques. For instance, a data center may essentially split the database instances associated with a data center's database content into active and standby instances.

The data centers may use any one or more of various techniques for replicating data to ensure that changes made to one center's data storage are duplicated in the other center's data storage. For instance, the data centers may use Oracle Hot Standby software to perform this task, e.g., as described at <<http://www/oracle.com/rdb/product_ino/html_documents/hotstdby.html>>. In this service, an ALS module transfers database changes to its standby site to ensure that the standby resources mirror the active resources. In one scenario, the first data center sends modifications to the standby site and does not follow up on whether these changes were received. In another scenario, the first data center waits for a message sent by the standby site to acknowledge receipt of the changes at the standby site.

An exemplary application of the above-described configuration is described in further detail below in the context of FIGS. 3 and 4. More specifically, FIG. 3 shows an exemplary technique for performing fail over operations in the system 100 of FIG. 1. FIG. 4 shows an exemplary technique for processing data requests in the system of FIG. 1. In general, these flowcharts explain actions performed by the system 100 shown in FIG. 1 in an ordered sequence of steps primarily to facilitate explanation of exemplary basic concepts involved in the present invention. However, in practice, selected steps may be performed in a different sequence than is illustrated in these figures. Alternatively, the system 100 may execute selected steps in parallel.

To begin with, in steps 302 and 304, the system 100 assesses the presence of a failure. Such a failure may indicate that a component of one of the data centers has become disabled, or the entirety of one of the data centers has become disabled, etc. Various events may cause such a failure, including equipment failure, weather disturbances, traffic overload situations, etc.

The system 100 may detect system failure conditions using various techniques. In one embodiment, the system 100 may employ multiple monitoring agents located at various levels in the network infrastructure to detect error conditions. For instance, various layers within a data center may detect malfunction within their layer, or within other layers with which they interact. Further, agents which are external to the data centers (such as external agents connected to the WAN/LAN network 102) may detect malfunction of the data centers.

Commonly, these monitoring agents assess the presence of errors based on the inaccessibility (or relatively inaccessibility) of resources. For instance, a typical heartbeat monitoring technique may transmit a message to a component and expect an acknowledgment reply therefrom in a timely manner. If the monitoring agent does not receive such a reply (or receives a reply indicative of an anomalous condition), it may assume that the component has failed. Those skilled in the art will appreciate that a variety of other monitoring techniques may be used depending on the business and technical environment in which the invention is deployed. In alternative embodiments, for instance, the monitoring agents may detect trends in monitored data to predict an imminent failure of a component or an entire data center.

Further, FIG. 3 shows that the assessment of failure conditions may occur at particular junctures in the processing performed by the system 100 (e.g., at the junctures represented by steps 302 and 316). In other embodiments, the monitoring agents assess the presence of errors in an independent fashion in parallel with other operations performed in FIG. 3. Thus, in this scenario, the monitoring agents may continually monitor the infrastructure for the presence of error conditions.

If a failure has occurred, the system 100 assesses the nature of the error (in step 100). For instance, the error condition may be attributed to the disablement of a component in one of the data centers, such as the resources contained within the data center's data storage. Alternatively, the error condition may reflect a total disablement of one of the data centers. Accordingly, in step 308, the system 100 determines whether a partial (e.g., component) failure or total failure has occurred in an affected data center (or possibly, multiple affected data centers).

For example, assume that only some of the active resources of one of the data centers have failed. In this case, in step 310, the system 100 activates appropriate standby resources in the other (standby) data center. This activation step may involve changing the state associated with the standby resources to reflect that these resources are now hot, as well as transferring various configuration information to the standby data center. For example, assume that the first active resources 114 in the first data center 104 have failed. In this case, the system 100 activates the second standby resources 124 in the second data center 106. Nevertheless, in this scenario, the distributor 107 may continue to route a user's data requests to the first data center 104, as this center is otherwise operable.

Alternatively, assume that there has been a complete failure of one of the data centers. In this case, in step 312, the system 100 activates appropriate standby resources in the other (standby) data center and also makes appropriate routing changes in the distributor 107 so as to direct a user's data request exclusively to the other (standby) data center. Activation of standby resources may involve transferring various configuration information from the failed data center to the other (standby) data center. For example, assume that the entirety of the first data center 104 has failed. In this case, the system 100 activates all of the standby resources in the second data center 106. After activation, the distributor 107 transfers a user's subsequent data requests exclusively to the second data center 106.

In step 316, the system 100 again assesses the failure condition affecting the system 100. In step 318, the system 100 determines whether the failure condition assessed in step 316 is different from the failure condition assessed in step 302. For instance, in step 302, the system 100 may determine that selected resources in the first data center are disabled. But subsequently, in step 318, the system 100 may determine that the entirety of the first data center 104 is now disabled. Alternatively, in step 318, the system 100 may determine that the failure assessed in step 302 has been rectified.

Accordingly, in step 320, the system 100 determines whether the failure assessed in step 302 has been rectified. If so, in step 322, the system restores the system 100 to its normal operating state. In one embodiment, a human administrator may initiate recovery at his or her discretion. For instance, an administrator may choose to perform recovery operations during a time period in which traffic is expected to be low. In other embodiments, the system 100 may partially or entirely automate recovery operations. For example, the system 100 may trigger recovery operations based on sensed traffic and failure conditions in the network environment.

If the failure has not been rectified, this means that the failure conditions affecting the system have merely changed (and have not been rectified). If so, the system 100 advances again to step 306, where the system 100 activates a different set of resources appropriate to the new failure condition (if this is appropriate).

FIG. 4 shows an exemplary process flow associated with the processing of data requests from users. In the illustrated and preferred embodiment, the system 100 employs a stateless method for processing requests. In this technique, the system processes each request for resources as a separate communicative session. More specifically, a user may access the on-line service to perform one or more transactions. Each transaction, in turn, may itself require the user to make multiple data requests. In the stateless configuration, the system 100 treats each of these requests as separate communicative sessions that may be routed to any available data center (depending on the metrics employed by the distributor 107).

Accordingly, in step 402, the distributor 107 receives a data request from a user, indicating that the user wishes to use the resources of the service. In response, in step 404, the distributor 107 routes the user's data request to an appropriate data center using conventional load-balancing considerations (identified above), or other considerations. For instance, if one of the data centers has entirely failed, the distributor 107 will route subsequent data requests to the other data center (which will have activated its standby resources, as discussed in the context of FIG. 3 above).

In the specific scenario shown in FIG. 4, the assumption is made that the distributor 107 has routed the user's data request to the first data center 104. However, the reader will appreciate that the labels first and second are merely used for reference purposes, and thus do not convey technical differences between the first and second data centers. Thus, the description that follows applies to the case where the distributor routes the user's data request to the second data center 106.

In step 406, the first data center 104 determines the resource needs of the user. For instance, a user may have entered an input request for particular information stored by the first data center 104, or particular functionality provided by the first data center 104. This input request defines a needed resource. In step 408, the first data center 104 determines whether the needed resource corresponds to an active instance of the data content 111. In other words, the first data center 104 determines whether the needed resource is contained in the first active resources 114 or the first standby resources 116. If the needed resource is contained within the active resources 114, in step 410, the system determines whether the active resources 114 are operative. If both the conditions set forth in steps 408 and 410 are satisfied, the first data center 104 provides the needed resource in step 414.

On the other hand, in step 412, the system 100 routes the user's data request to the second data center if: (a) the needed resource is not contained within the first active resources 114; or (b) the needed resource is contained within the first active resources 114, but these resources are currently disabled. More specifically, the first data center 104 may route a request for the needed resource through the inter-center network 128 using, for instance, conventional SQL*Net messaging protocol, or some other type of protocol. In step 416, the system 100 provides the needed resource from the second data center 106.

Thereafter, the system returns to step 402 to process subsequent data requests from a user.

In another scenario, the second data center 106 may have suffered a partial or complete failure. As discussed above, this prompts the system 100 to activate the standby resources 116 of the first data center 104. This, in turn, prompts the system 100 to return an affirmative response to the query specified in step 408 of FIG. 4 regardless of whether the needed resource is contained within the resources 114 or 116 of the first data center 104 (as the actives resources have been effectively expanded to include the entire memory content of storage 117).

By virtue of the above described procedure, the two data centers provide a distributed processing environment for supplying resources. In other words, the first data center effectively treats the active resources of the second data center as an extended portion of its own database. Likewise, the second data center effectively treats the active resources of the first data center as an extended portion of its own database. By virtue of this feature, the user receives the benefit of high availability produced by redundant network resources, even though the user may be unaware of the back-end complexity associated with this infrastructure.

FIGS. 5–8 show different scenarios corresponding to the processing conditions discussed above. Namely, in FIG. 5, the distributor 107 has allocated a data request to the first data center 104. Further, the user has requested access to a needed resource 182 that lies within the first active resources 114. In this case, the system 100 retrieves this needed resource 182 from the first active resources 114, as logically illustrated by the dashed path 184.

Figure 6:
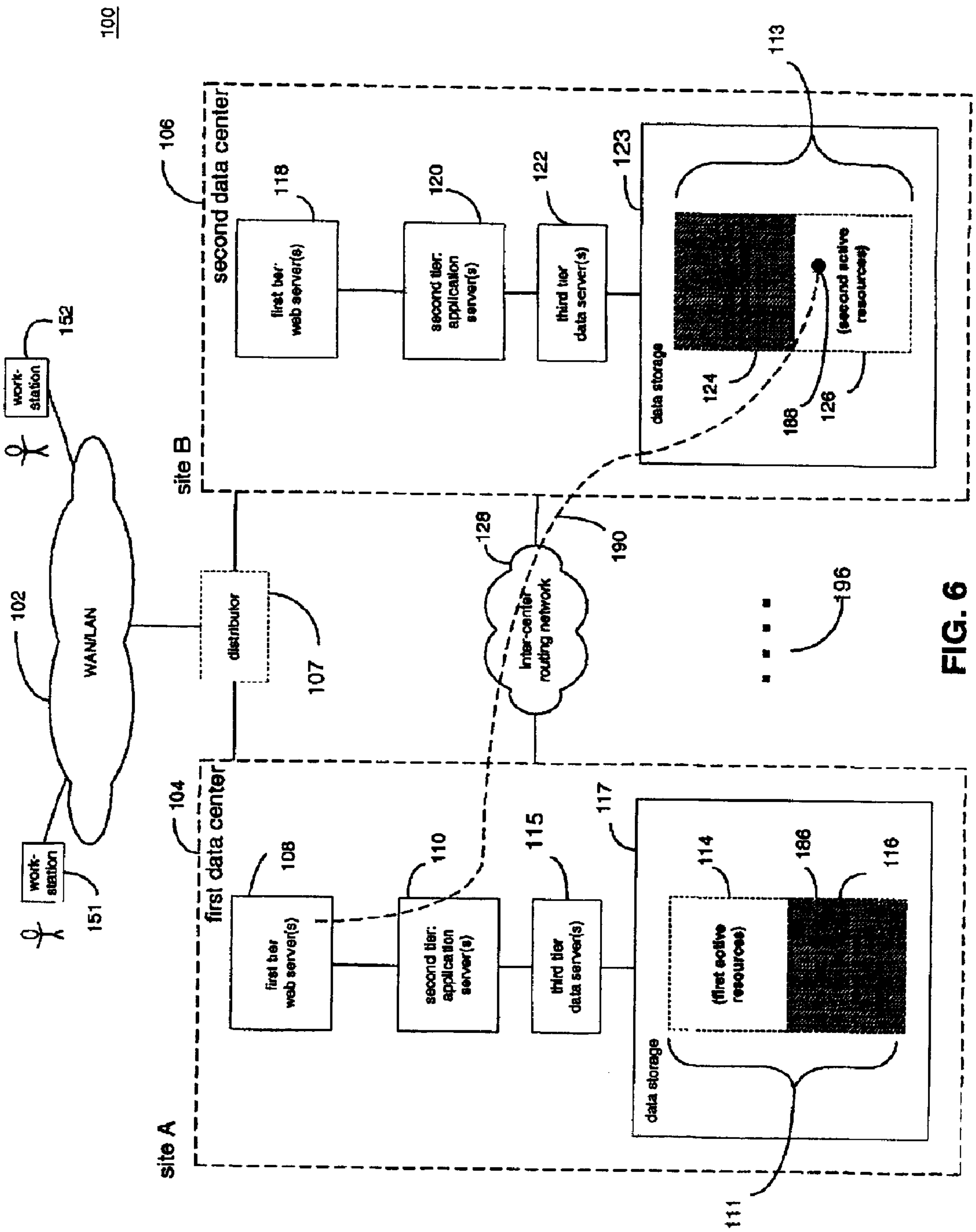

In FIG. 6, the distributor 107 has again allocated a user's data request to the first data center 104. In this case, the user has requested access to a needed resource 186 that lies within the first standby resources 116. In response, the system 100 retrieves the counterpart resource 188 of this needed resource from the second active resources 126 of the second data center 104. This is logically illustrated by the dashed path 190.

Figure 7:
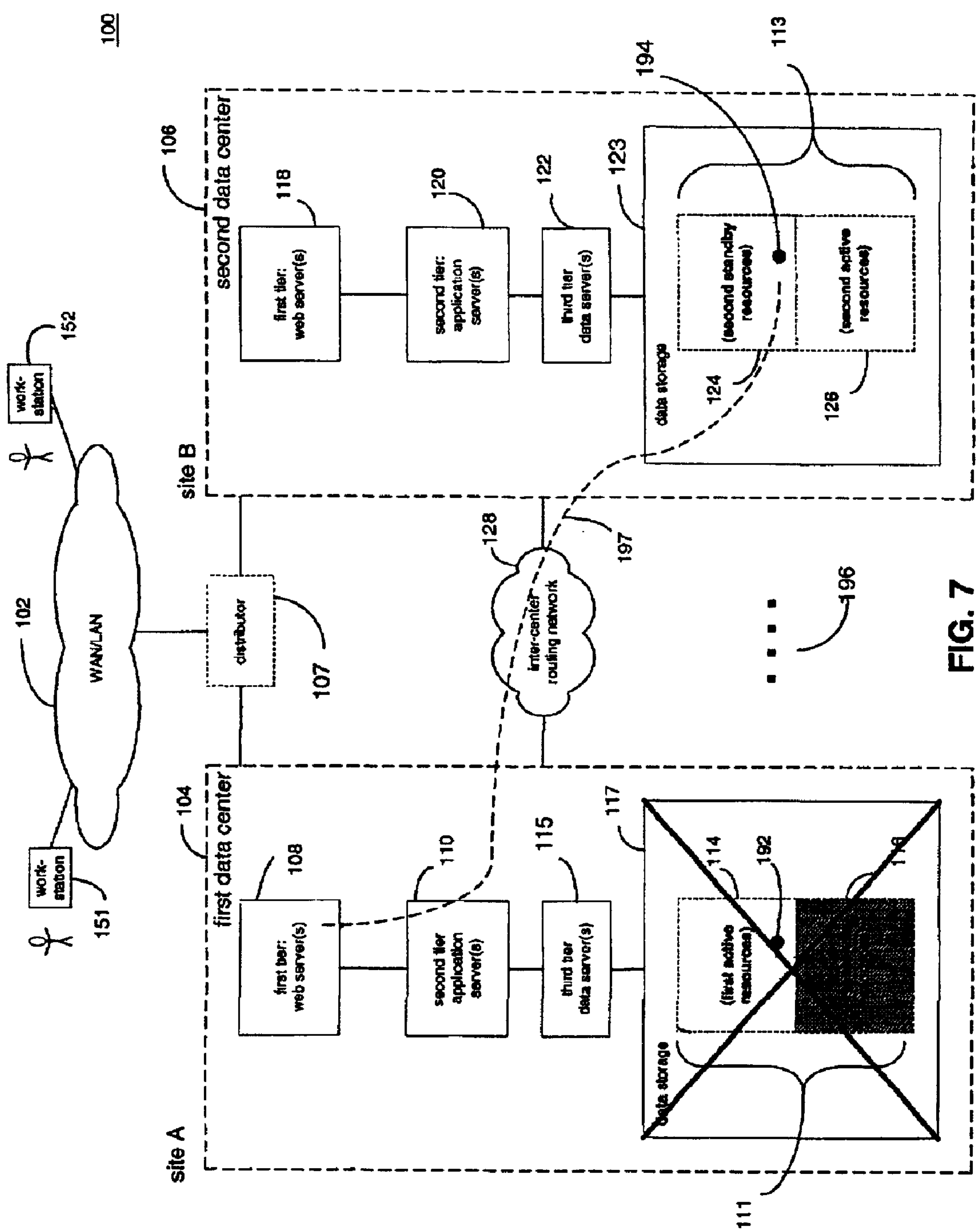

In FIG. 7, the distributor 107 has again allocated a user's data request to the first data center 104. In this case, the user has requested access to a needed resource 192 that lies within the first active resources 114, but there has been a local failure within the data storage 117, effectively disabling this module. In response, the system 100 retrieves the counterpart resource 194 of this needed resource from the second standby resources 124 of the second data center 104 (having previously activating these standby resources). This is logically illustrated by the dashed path 197.

Figure 8:
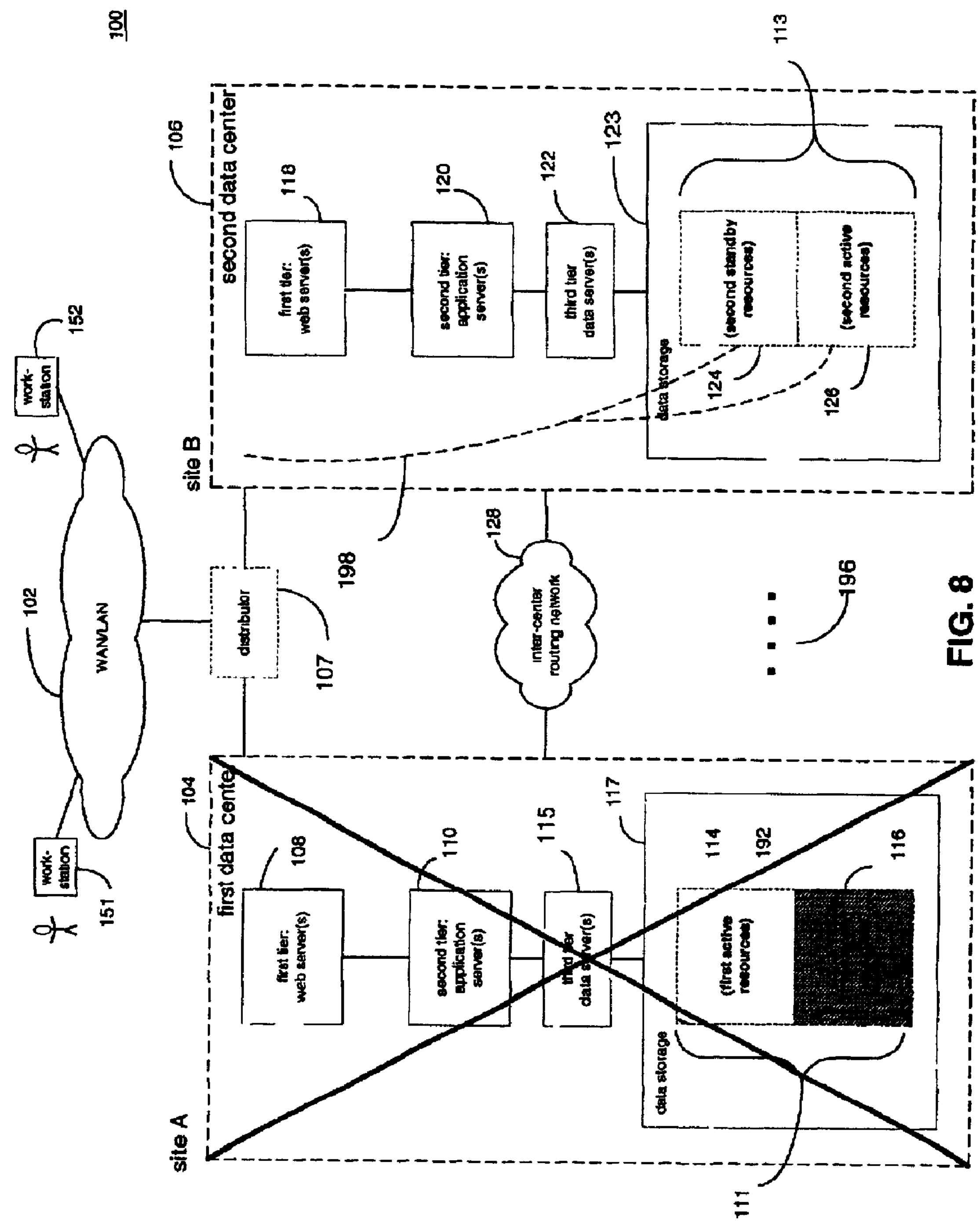

FIG. 8 illustrates a case where the entirety of the first data center 104 has become disabled. In response, the distributor 107 allocates a user's subsequent data requests to the second data center 104 (having previously activated the standby resources in this center). The user may thereafter access information from any part of the memory content 113. This is logically illustrated by the dashed path 198.

The above-described architecture and associated functionality may be applied to any type of network service that may be accessed by any type of network users. For instance, the service may be applied to a network service pertaining to the financial-related fields, such as the insurance-related fields.

The above-described technique provides a number of benefits. For instance, the use of multiple sites having reciprocally-activated redundant resources provides a service having a high degree of availability to the users, thus reducing the delays associated with high traffic volume. Further this high-availability is achieved in a manner that is transparent to the users, and does not appreciably complicate or delay the users' communication sessions. Further, the use of multiple data centers located at multiple respective sites better ensures that the users' sessions will not be disrupted upon the occurrence of a failure at one of the sites. Indeed, in preferred embodiments, the users may be unaware of such network disturbances.

The system 100 may be modified in various ways. For instance, the above discussion was framed in the context of two data centers. But, in alternative embodiments, the system 100 may include additional data centers located at additional sites. In that case, the respective database content at the multiple sites may be divided into more than two portions. In this case, each of the data centers may designate a different portion as active, and the remainder as standby. For instance, in the case of three data centers, a first data center may designate a first portion as active, and the second and third portions as standby. The second data center may designate a second portion as active, and the first and third portions as standby. And the third data center may designate the third portion as active, and the remainder as standby. In preferred embodiments, each of the data centers stores identical content in the multiple portions. Those skilled in the art will appreciate that yet further allocations of database content are possible to suit the needs of different business and technique environments.

Further, to simplify discussion, the above discussion was framed in the context of identically-constituted first and second data centers. However, the first data center 104 may vary in one or more respects from the second data center 106. For instance, the first data center 104 may include processing resources that the second data center 106 lacks, and vice versa. Further the first data center 104 may include data content that the second data center 106 lacks, and vice versa. In this embodiment, the high-availability features of the present invention may be applied in partial fashion to safeguard those portions of the data centers which have redundant counterparts in other data centers. Accordingly, reference to first and second actives resources, and first and second standby resources in this disclosure does not preclude the additional presence of non-replicated information stored in the databases of the data centers.

Further, the above discussion was framed in the exemplary context of a distributor module 107 that selects between the first and second data centers based on various efficiency-based considerations. However, the invention also applies to the case where the first and second data centers have different network addresses. Thus, a user inputting the network address of the first data center would be invariably coupled with the first data center, and a user inputting the network address of the second data center would be invariably coupled to the second data center. Nevertheless, the first and second data centers may be otherwise configured in the manner described above, and operate in the manner described above.

Further, the above discussion was framed in the context of automatic assessment of failure conditions in the network infrastructure. But, in an alternative embodiment, the detection of failure conditions may be performed based on human assessment of failure imminent conditions. That is, administrative personnel associated with the service may review traffic information regarding ongoing site activity to assess failure conditions or potential failure conditions. The system may facilitate the administrator's review by flagging events or conditions that warrant the administrator's attention (e.g., by generating appropriate alarms or warnings of impending or actual failures).

Further, in alternative embodiments, administrative personnel may manually reallocate system resources depending on their assessment of the traffic and failure conditions. That is, the system may be configured to allow administrative personnel to manually transfer a user's communication session from one data center to another, or perform partial (component-based) reallocation of resources on a manual basis.

Further, the above discussion was based on the use a stateless (i.e., atomic) technique for providing network resources. In this technique, the system 100 treats each of the user's individual data requests as separate communication sessions that may be routed by the distributor 107 to any available data center (depending on the metrics used by the distributor 107). In another embodiment, the system may assign a data center to a user for performing a complete transaction which may involve multiple data requests (e.g., and which may be demarcated by discrete sign on and sign off events). Otherwise, in this embodiment, the system 100 functions in the manner described above by routing a user's data request to the standby data center on an as needed basis.

Further, in the above discussion, the system 100 handled partial (e.g., component-based) failures and complete (e.g., center-based) failures in a different manner. In an alternative embodiment, the system 100 may be configured such that any failure in a data center prompts the distributor 107 to route a user's data request to a standby data center.

Other modifications to the embodiments described above can be made without departing from the spirit and scope of the invention, as is intended to be encompassed by the following claims and their legal equivalents.

What is claimed is:

1. A system for providing a network service to users, comprising:

a first data center for providing the network service at a first geographic location, including:

first active resources configured for active use;

first standby resources configured for standby use in the event that active resources cannot be obtained from another source;

first logic for managing access to resources;

a second data center for providing the network service at a second geographic location, including:

second active resources configured for active use;

second standby resources configured for standby use in the event that active resources cannot be obtained from another source;

second logic for managing access to resources;

wherein the first active resources include the same resources as the second standby resources, and wherein the first standby resources include the same resources as the second active resources, and wherein, the first logic is configured to: assess a needed resource for use by a user coupled to the first data center; determine whether the needed resource is contained within the first active resources or the first standby resources of the first data center; provide the needed resource from the first active resources if the needed resource is contained therein; provide the needed resource from the second active resources of the second data center if the needed resource is contained within the standby resources of the first data center;

wherein, the second logic is configured to: assess a needed resource for use by a user coupled to the second data center; determine whether the needed resource is contained with the second active resources or the second standby resources of the second data center; provide the needed resource from the second active resources if the needed resource is contained therein; and provide the needed resource from the first active resources of the first data center if the needed resource is contained within the second standby resources of the second data center;

wherein the first active resources and the first standby resources comprise first database content maintained in a first database; and wherein the second active resources and the second standby resources comprise second database content maintained in a second database.

2. The system of claim 1, wherein:

the first logic is further configured to: assess whether the first active resources have become disabled; and, in response thereto, route a request for a needed resource to the second data center, and the second logic is further configured to: assess whether the second active resources have become disabled; and, in response thereto, route a request for a needed resource to the first data center.

3. The system of claim 1, wherein the system further includes a distributor module for distributing a user's request for network services to at least the first or second data centers.

4. The system of claim 3, wherein the distributor module further includes:

logic for receiving information regarding a failure of the first data center, and for transferring subsequent requests for resources to the second data center, and logic for receiving information regarding a failure of the second data center, and for transferring subsequent requests for resources to the first data center.

5. The system of claim 1, wherein:

the first data center includes:

a first database;

a first network access tier including logic for managing a user's access to the first data center;

a first application tier including application logic for administering the network service; and a first data access tier for managing access to the first database;

the second data center includes;

a second database;

a second network access tier including logic for managing a user's access to the second data center;

a second application tier including application logic for administering the network service; and a second database tier including logic for managing access to the second database.

6. The system of claim 1, wherein:

the first logic maintains instances corresponding to the first database content, wherein the states of the instances define whether the resources in the first database form part of the first active resources or the first standby resources; and the second logic maintains instances corresponding to the second database content, wherein the states of the instances define whether the resources in the second database form part of the second active resources or the second standby resources.

7. The system of claim 1, wherein a wide area network couples at least one user to the first data center or the second data center.

8. The system of claim 1, wherein the system further includes an inter-center routing network that couples the first and second data centers.

9. The system of claim 8, wherein:

the first logic is configured to route requests to the second active resources of the second data center via the inter-center routing network, and the second logic is configured to route requests to the first active resources of the first data center via the inter-center routing network.

10. A method system for providing a network service to users, comprising:

in a system including first and second data centers located and first and second geographic locations, respectively, coupling a user to the first data center, wherein:

the first data center includes first active resources configured for active use; and first standby resources configured for standby use in the event that active resources cannot be obtained from another source;

the second data center includes second active resources configured for active use; and second standby resources configured for standby use in the event that active resources cannot be obtained from another source;

assessing a resource needed by the user, defining a needed resource;

determining whether the needed resource is contained with the first active resources or the first standby resources of the first data center;

providing the needed resource from the first active resources if the needed resource is contained therein; and providing the needed resource from the second active resources of the second data center if the needed resource is contained within the standby resources of the first data center, wherein the first active resources include the same resources as the second standby resources, and wherein the first standby resources include the same resources as the second active resources;

wherein the first active resources and the first standby resources comprise first database content maintained in a first database; and wherein the second active resources and the second standby resources comprise second database content maintained in a second database.

11. The method of claim 10, further including the steps of:

assessing whether the first active resources have become disabled; and in response thereto, routing a request for a needed resource to the second data center.

12. The method of claim 10, further including the steps of:

receiving information regarding a failure of the first data center; and in response thereto, transferring subsequent requests for resources to the second data center.

13. The method of claim 10, wherein;

the first data center maintains instances corresponding to the first database content, wherein the states of the instances define whether the resources in the first database form part of the first active resources or the first standby resources; and the second data center maintains instances corresponding to the second database content, wherein the states of the instances define whether the resources in the second database form part of the second active resources or the second standby resources.

14. The method of claim 10, wherein a wide area network couples at least one user to the first data center or the second data center.

15. The method of claim 10, wherein an inter-center routing network couples the first and second data centers.

16. The method of claim 15, wherein:

the first data center routes a request for a needed resource in the second active resources via the inter-center routing network, and the second data center routes a request for a needed resource in the first active resources via the inter-center routing network.

* * * * *